Oct. 23, 1934. P. M. MILLER 1,978,026
VEHICLE WHEEL
Filed Jan. 26, 1931 2 Sheets-Sheet 1

Inventor
Philip M. Miller

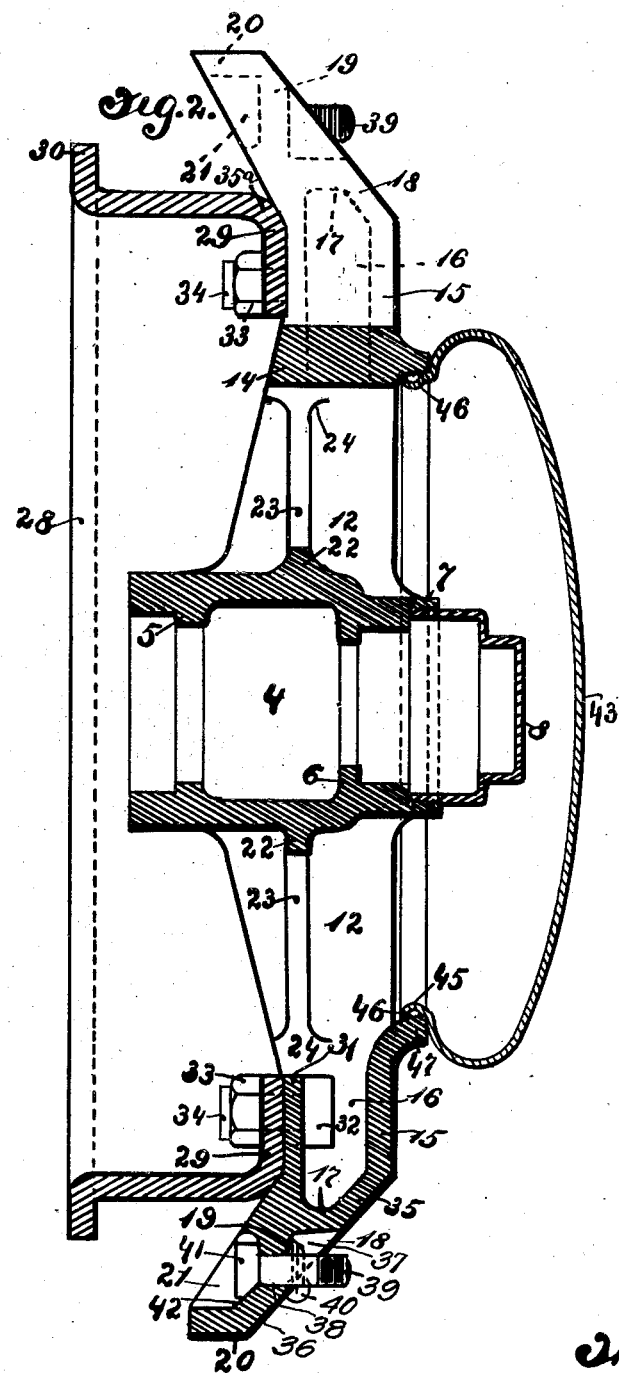

Patented Oct. 23, 1934

1,978,026

UNITED STATES PATENT OFFICE 1,978,026

VEHICLE WHEEL

Philip M. Miller, Cleveland, Ohio

Application January 26, 1931, Serial No. 511,360

7 Claims. (Cl. 301—6)

This invention relates to wheels for motor vehicles and particularly to wheels of the cast metal type.

In the production of cast metal wheels for both light and heavy duty vehicles, the chief problems to be solved are to make the wheel sufficiently light in weight without sacrificing the necessary strength. Naturally, the less metal involved in the construction of the wheel, the lighter the wheel will be, but it has heretofore been considered impractical to eliminate sufficient metal in the construction of a cast metal artillery type wheel to bring it within the field of use for light duty vehicles.

An object of the present invention therefore is to so construct a cast metal spider member as to render it sufficiently light in weight for use with both light and heavy duty wheel assemblies without sacrificing the necessary strength to enable it to withstand both light and heavy duty service.

Another object of the invention is to provide a cast metal wheel assembly which is relatively light in weight, is possessed of adequate strength to withstand both light and heavy duty service, and at the same time has symmetrical lines and beauty of design.

Another object of the invention is to provide a cast metal wheel assembly which is in effect of a self-ventilating nature.

The foregoing and other objects and advantages will become apparent in view of the following description taken in conjunction with the drawings, wherein:

Fig. 2 is a transverse section taken substantially on the line 2—2, Fig. 1; and

Figure 1:
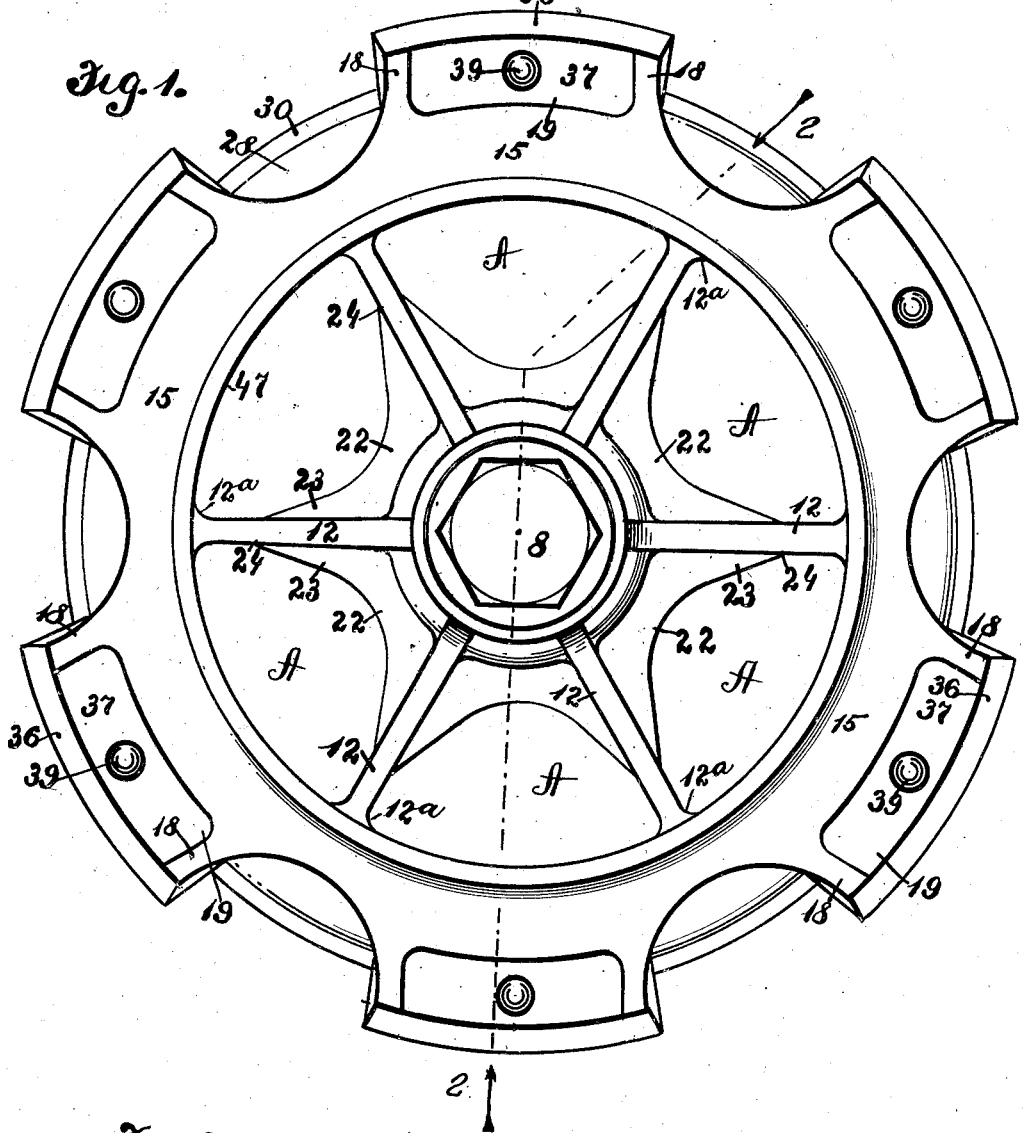
Figure 1 is a view in outboard side elevation of a cast metal spider member embodying the features of the present invention together with a particular type of reinforcing brake drum member associated therewith.
Figure 3:
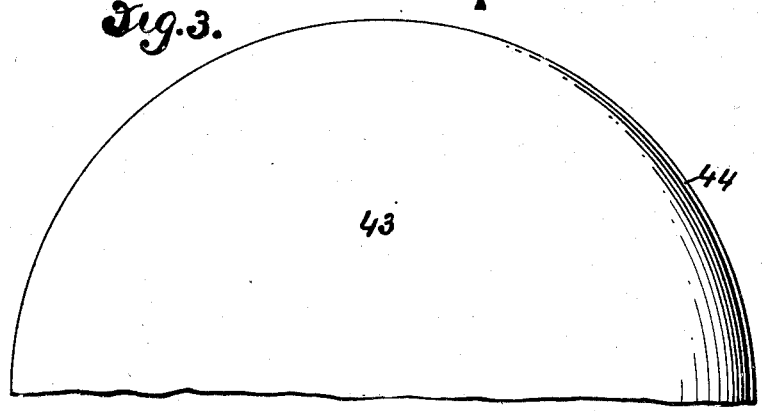
Fig. 3 is a fragmentary view in elevation of a nave covering shell which is associated with the spider member.

The wheel assembly comprises, in general, three main parts: a cast metal spider member, a brake drum member, and a nave covering shell. Considering, first, the cast metal spider member, 4 generally designates the hub barrel having formed on the interior thereof annular bearing retainer bosses or flanges 5 and 6, the outer end of the barrel being formed with an internally threaded neck or projection 7 adapted to receive a grease retainer or hub cap 8. Formed integrally with the hub barrel 4 are a plurality of radially projecting ribs 12, said ribs merging at their outer ends into an annular circumferentially arched body wall, said wall being formed solid at the point where the ribs merge therewith, as indicated at 14 in Fig. 2, and between said solid portions the wall is projected radially into a plurality of relatively short hollow spokes whose construction is clearly shown at the lower portion of Fig. 2. Each spoke is formed with an outboard wall 15, a roof wall 17, side walls 18, and a rear wall 31, said walls defining a ventilating chamber 16 which opens at its base into the open central portion of the nave which is generally indicated at A in Fig. 1 of the drawings. The radially outer extremity of each spoke is inclined transversely inwardly as indicated at 19, and at its end each spoke terminates in a wall 20, the outer extremities of the spokes being given a particular contour to facilitate demountable association of a tire rim therewith. The inboard side of each spoke end is formed with a recessed portion 21 adapted to house the end of clamp bolts, which will later be referred to.

To reinforce the open nave portion of the wheel, reinforcing webs 22 are cast between the spokes 12, said webs tapering towards the ribs as indicated at 23 and finally merging therewith well toward the outer extremity of the ribs as indicated at 24, and the ribs are further reinforced at their points of joinder to wall 14 by means of fillets.

In order to reinforce the spider member, a particular type of brake drum generally indicated at 28 is provided, said drum being formed with a reduced web 29 which is of curved contour as indicated at 35a at the point where it joins the braking flange of the drum, said curved portion fitting into the curve generated by the inclined extremities of the spokes and serving to reinforce the latter as well as the cast metal spider member as a whole. The brake drum is also formed with the conventional peripheral flange 30. The drum is locked to the spider member by means of bolts 32 and nuts 33, the latter being tightened to clamp the drum in position, and the ends of the bolt 32 being then peened over as at 34 to effectively lock the nuts 33 against displacement. A drum of the short web type not only serves to reinforce the spider member, but is also light in weight and may be formed by rolling in contradistinction to the conventional stamping or casting process. In making a drum of this type, I preferably roll a strip of metal containing the desired amount of carbon into the desired shape and weld the meeting ends together to provide an annulus and the drum is finally sized with a die to the exact dimensions.

The radial outer extremity of each spoke is shaped as at 36 to facilitate the application of a tire rim, not here shown, and inwardly from the wall 36 a recess 37 is defined between the side walls 18 and wall 17, said recess being adapted to receive a rim clamping member, not shown, said latter member being carried by rim clamping bolts 39 having their heads engaged in the recess 21 on the inboard side of the spoke. The bolts 41 are preferably held in permanent association with the spoke ends by means of cotter keys or the like 40. The heads of the bolts 41 engage against the beveled wall 42 which prevents angular movement of the bolt during the rim mounting and demounting operation.

A nave covering shell 43 is provided to prevent entrance of foreign particles into the wheel body and also to complete the symmetrical contour of the wheel and enhance its appearance. The edge of the shell is formed with a snap-on bead 45 adapted to engage over studs or analogous means 46 projecting from a transversely extended annular neck portion or flange 47 provided on the outboard side of the spider member in order to accommodate the mounting of the shell 43.

By noting the drawings in conjunction with the foregoing description, it will be seen that I have provided a cast metal wheel assembly which due to its design, is relatively light in weight and is possessed of relatively great strength due to the fact that the spider member is reinforced against both torque thrust and lateral stresses, while at the same time a minimum amount of metal is used in producing the spider casting. The hollow character of the spokes in conjunction with the open nave portion serve to ventilate the wheel structure while in service on the road and maintain the wheel cool and obviate generation of heat in the assembly as a whole. The arched lines of the spoke body wall 14 together with the staggered arrangement of ribs with respect to the spokes produce a reinforced structure having beauty of design. In regard to the ventilating action set up in the wheel body due to the hollow construction of the spider member, it is not necessary that the hollow wheel body be open to the atmosphere since there is sufficient air admitted into the wheel to carry off the heat generated while in service on the road. The particular construction of the hub barrel and ribs 12, which at their base portions are extended over the greater portion of the hub barrel and taper at their periphery into the body wall 14, tend to produce a structure which is adequately reinforced against side thrust.

It will be understood that certain variations in structure may be adopted within the scope of the invention as defined by the appended claims.

I claim:

1. A metal wheel assembly for motor vehicles, comprising a one-piece cast spider member formed with a hub having ribs projecting therefrom in spider formation and merging into an annular transverse wall, said wall being solid at the points of termination of the ribs and between said solid portions being extended arcuately radially in the form of relatively short projections which define the spokes of the wheel, each spoke being formed hollow, defining a ventilating chamber which opens at one end toward the center of the wheel between said ribs and is closed at its other end by a wall extending transversely of said spoke, a brakedrum having a reduced web which is secured to the inner walls of said chamber and reinforces the annular spoke wall of the spider member, and a shell member detachably secured to said annular transverse wall and closing off the rib area of the wheel.

2. A metal wheel for motor vehicles, comprising a one-piece cast spider member formed with a hub having ribs projecting therefrom in spider formation and merging into an annular transverse wall, said wall being solid at the points of termination of the ribs and between said solid portions being extended arcuately radially to define the spokes of the wheel, each spoke being in the form of a relatively short projection which is formed hollow, defining a ventilating chamber which opens at one end toward the center of the wheel between said ribs and is closed off at its other end by a wall extending transversely of the spoke, each spoke extending in a substantially vertical plane from said wall and then being inclined at an angle for the remainder of its length, each of said ribs being formed with a web which is transversely extended at the hub and tapers toward said annular wall to reinforce the latter against strains imposed thereon due to the inclination of said spokes, and a shell member detachably secured to said annular wall and closing off the rib area of the wheel.

3. In a wheel for motor vehicles, a one-piece cast spider member formed with a hub having ribs projecting therefrom in spider formation and merging into an annular transverse wall, said wall being solid at the points of termination of the ribs and between said solid portions being extended radially in the form of relatively short arcuate projections which define the spokes of the wheel, each spoke being formed hollow, defining a ventilating chamber which opens at one end toward the center of the wheel between said ribs and is closed off at its opposite end by a wall extending transversely of the spoke, each of said spokes being inclined inwardly for a portion of its length, and a brake drum having a reduced web which is secured to the inner wall of said spokes and a rounded web portion which fits into the curve generated by the incline formed in the inboard wall of said spokes and braces the latter.

4. A metal wheel assembly for motor vehicles, comprising a one-piece cast spider member formed with a hub integral with ribs spacedly projecting therefrom in spider formation to form openings therebetween and merging into an annular transverse wall provided with an outboard shell-engaging flange and an inboard brake-drum-engaging flange, both said flanges simultaneously bracing the ends of the said ribs for a stiff construction, said annular wall being solid at points of termination of the ribs and between said solid portions being extended radially to define the spokes of the wheel, each spoke being formed with a chamber which is open at its inner end and is closed at its outer end, each spoke extending outwardly and forming a free spoke end, a brake drum member provided with a relatively short attaching flange in contact with the said brake-drum-engaging flange, bolts passed through openings in said flanges of the brake drum and spider member, a nut on each bolt locking the parts together, the said brake drum being in engagement with said brake-drum-engaging flange at a point such that the entire attaching flange of the brake drum is in rigid contact with the side of the spider structure adjacent the periphery of the wheel for bracing the free portions of the spokes, and a shell member removably engaged with the said outer side shell-engaging flange adapted to close off the rib area of the spider structure and enclosing the hub thereof to prevent ingress of foreign substances into the interior thereof.

5. A metal wheel assembly for motor vehicles, comprising a one-piece cast spider member formed with a hub having ribs projecting therefrom in spider formation to form openings therebetween and merging into an annular transverse wall, said wall being solid at points of termination of the ribs and between said solid portions being extended radially to define relatively short, curved spokes, each spoke being formed hollow, defining a chamber which opens at one end toward the center of the wheel between said ribs and is closed at its other end by a wall joining the parts together, each spoke extending radially and terminating in a rim supporting head, a brake drum having a short attaching flange which is secured to the inner walls of said chambers at a remote distance from the center of the wheel and in close proximity to the periphery thereof, the said arrangement of attaching flange of the brake drum in proximity to the periphery of the wheel being adapted to stiffen the brake drum as a whole and thereby strengthen the periphery of the wheel, and a shell member detachably secured to the said annular transverse wall and closing off the rib area of the wheel to prevent entrance of foreign substances into the interior thereof.

6. A metal wheel assembly for motor vehicles, comprising a one-piece cast spider member formed with a hub having ribs projecting therefrom in spider formation and merging into an annular transverse wall, said wall being solid at the points of termination of the ribs and between said solid portions being extended radially to define short spokes having free spoke ends, each spoke being formed with a chamber which is open at one end toward the center of the wheel and is closed at its other end by a wall uniting the walls at the spoke end, each of the spokes extending radially to form a free head, the length of the entire spoke being less than the distance from the inner portion thereof to the center of the wheel whereby a relatively large open ventilating nave area is provided which materially lightens the wheel without sacrificing peripheral strength due to the cooperating rib and spoke wall construction, a brake drum provided with a reduced attaching flange adapted to stiffen the entire construction thereof, said attaching flange being in engagement with the inboard side of the spokes and fastened thereto by locking means, said means being concealed by said brake drum and within the chamber of each of the spokes to provide a smooth countenance on the outer side of the spokes, said attaching flange of the brake drum circumferentially bracing the inner ends of the spokes to rigidly support the heads thereof against torque and side thrust strains exerted thereagainst due to centrifugal force created by the revolving wheel while traveling on a road under load.

7. In a wheel for motor vehicles, a one-piece cast spider member formed with a hub, ribs projecting radially from said hub in spider formation, an annular transverse wall merged with the outer ends of said ribs, said wall being formed with a plurality of hollow radial projections defining the spokes of the wheel, said ribs and spokes being staggered circumferentially and each spoke extending substantially vertically from said wall for a portion of its length and inclining inwardly for the remaining portion, a brake drum having a reduced web secured to said transverse wall at the base of the spokes and fitting into the inclined portions thereof and serving to reinforce said spokes, the entire rib area of the wheel being open from the outboard side of the wheel through the drum, and a shell member secured to the outboard edge of said wall and covering said open area.

PHILIP M. MILLER.